(12) United States Patent
Sadiq et al.

(10) Patent No.: US 10,652,893 B2
(45) Date of Patent: May 12, 2020

(54) BEAM DETERMINATION DURING A REFERENCE SIGNAL TRANSMISSION

(71) Applicant: QUALCOMM Incorporated, San Diego, CA (US)

(72) Inventors: Bilal Sadiq, Basking Ridge, NJ (US); Juergen Cezanne, Ocean Township, NJ (US); Sundar Subramanian, San Diego, CA (US); Tianyang Bai, Bridgewater, NJ (US); Muhammad Nazmul Islam, Edison, NJ (US); Sony Akkarakaran, Poway, CA (US); Alexei Yurievitch Gorokhov, San Diego, CA (US); Raghu Narayan Challa, San Diego, CA (US); Shay Landis, Hod Hasharon (IL); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/163,264

(22) Filed: Oct. 17, 2018

(65) Prior Publication Data
US 2019/0159188 A1 May 23, 2019

Related U.S. Application Data

(60) Provisional application No. 62/588,167, filed on Nov. 17, 2017.

(51) Int. Cl.
*H04W 4/00* (2018.01)
*H04W 72/04* (2009.01)
(Continued)

(52) U.S. Cl.
CPC ............ *H04W 72/046* (2013.01); *H04B 7/08* (2013.01); *H04B 7/088* (2013.01); *H04W 72/02* (2013.01); *H04B 7/0632* (2013.01); *H04W 72/14* (2013.01)

(58) Field of Classification Search
CPC ...... H04W 72/046; H04W 72/02; H04B 7/08; H04B 7/088
(Continued)

(56) References Cited

U.S. PATENT DOCUMENTS

2012/0182895 A1* 7/2012 Jwa ...................... H04W 72/046
370/252
2019/0044601 A1* 2/2019 Chang ............... H04W 36/0022
(Continued)

FOREIGN PATENT DOCUMENTS

WO 2017197125 A1 11/2017

OTHER PUBLICATIONS

International Search Report and Written Opinion—PCT/US2018/056461—ISA/EPO—dated Jan. 24, 2019.

*Primary Examiner* — Thai D Hoang
(74) *Attorney, Agent, or Firm* — Patterson & Sheridan, L.L.P./Qualcomm Incorporated

(57) ABSTRACT

Certain aspects of the disclosure provide techniques for a user equipment (UE) to determine a receive beam of a plurality of receive beams for receiving an upcoming transmission from a base station, wherein the determining is based on whether an indication is received from the base station indicating if the upcoming transmission includes a reference signal (RS) multiplexed with additional data. The techniques further provide for the UE to receive the upcoming transmission using the determined receive beam.

30 Claims, 9 Drawing Sheets

(51) Int. Cl.
  *H04B 7/08* (2006.01)
  *H04W 72/02* (2009.01)
  *H04W 72/14* (2009.01)
  *H04B 7/06* (2006.01)

(58) Field of Classification Search
  USPC ................. 370/329–330, 335–345, 532–541
  See application file for complete search history.

(56) References Cited

U.S. PATENT DOCUMENTS

| | | | |
|---|---|---|---|
| 2019/0045460 A1* | 2/2019 | Muruganathan | H04B 7/0617 |
| 2019/0159136 A1* | 5/2019 | MolavianJazi | H04W 52/08 |
| 2019/0229792 A1* | 7/2019 | John Wilson | H04B 7/0626 |
| 2019/0253220 A1* | 8/2019 | Kim | H04B 7/0617 |
| 2019/0261244 A1* | 8/2019 | Jung | H04L 1/20 |
| 2019/0281587 A1* | 9/2019 | Zhang | H04L 1/00 |
| 2019/0288794 A1* | 9/2019 | Yamada | H04W 74/0833 |
| 2019/0319686 A1* | 10/2019 | Chen, IV | H04W 72/046 |

* cited by examiner

US 10,652,893 B2

BEAM DETERMINATION DURING A REFERENCE SIGNAL TRANSMISSION

CROSS-REFERENCE TO RELATED APPLICATIONS

This application claims the benefit of U.S. Provisional Patent No. 62/588,167, filed Nov. 17, 2017. The content of the provisional application is hereby incorporated by reference in its entirety.

INTRODUCTION

Aspects of the present disclosure relate to wireless communications and to a user equipment (UE) configured to determine a beam of a plurality of beams on which to receive signals.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

SUMMARY

As described herein, certain wireless systems may employ directional beams for transmission and reception. Aspects of the present disclosure provide methods for a UE selecting which beam to use for receiving signals from a BS.

Certain aspects of the present disclosure provide a method for wireless communication that may be performed, for example, by a UE. The method includes determining a receive beam of a plurality of receive beams for receiving an upcoming transmission from a base station, wherein the determining is based on whether an indication is received from the base station indicating if the upcoming transmission includes a reference signal (RS) multiplexed with additional data. The method further includes receiving the upcoming transmission using the determined receive beam.

Certain aspects of the present disclosure provide a UE. The UE includes a memory and a processor. The processor is configured to determine a receive beam of a plurality of receive beams for receiving an upcoming transmission from a base station, wherein the determining is based on whether an indication is received from the base station indicating if the upcoming transmission includes a reference signal (RS) multiplexed with additional data. The processor is further configured to receive the upcoming transmission using the determined receive beam.

Certain aspects of the present disclosure provide a UE. The UE includes means for determining a receive beam of a plurality of receive beams for receiving an upcoming transmission from a base station, wherein the determining is based on whether an indication is received from the base station indicating if the upcoming transmission includes a reference signal (RS) multiplexed with additional data. The UE further includes means for receiving the upcoming transmission using the determined receive beam.

Certain aspects of the present disclosure provide a non-transitory computer readable storage medium that stores instructions that when executed by a user equipment (UE) causes the UE to perform a method for wireless communication. The method includes determining a receive beam of a plurality of receive beams for receiving an upcoming transmission from a base station, wherein the determining is based on whether an indication is received from the base station indicating if the upcoming transmission includes a reference signal (RS) multiplexed with additional data. The method further includes receiving the upcoming transmission using the determined receive beam.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
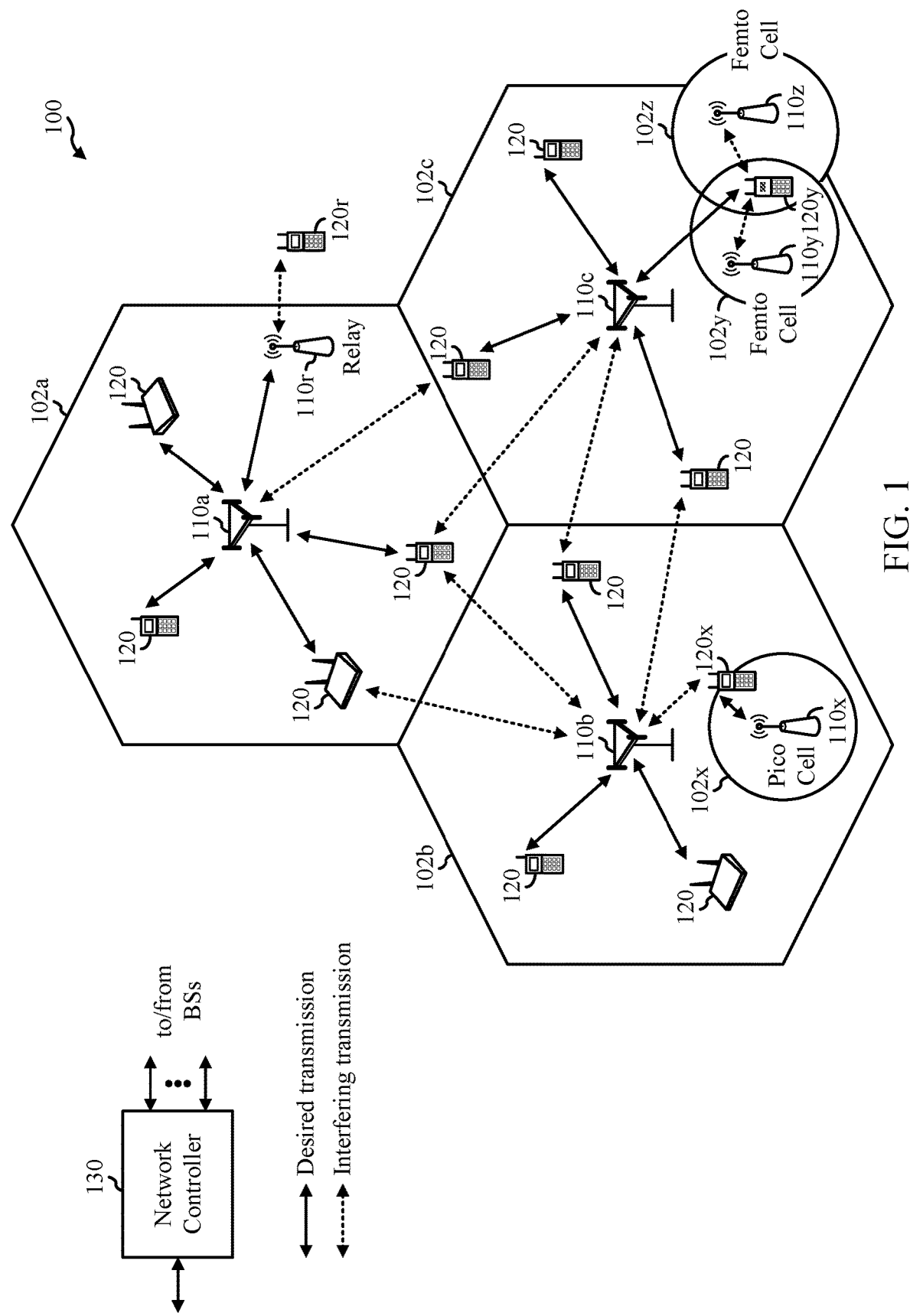
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz or beyond), millimeter wave (mmW) targeting high carrier frequency (e.g. 25 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

mmW communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited for the random access channel (RACH).

Spectrum bands in high frequencies (e.g., mmW) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmW operate, small wavelengths enable a large number of antenna elements in a relatively small form factor. Unlike microwave links, which may cast very wide footprints, reducing the achievable amount of reuse of the same spectrum within a geographical area, mmW links cast very narrow beams (for example, beams may have a narrow angle). This characteristic of mmW may be leveraged to form directional beams that may send and receive more energy to overcome propagation and path loss challenges.

These narrow directional beams can also be utilized for spatial reuse. This is one of the key enablers for utilizing mmW for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

In certain aspects, a base station (BS) may be configured to transmit one or more reference signals (RSs) to a user equipment (UE). For example, the BS may use beamforming to transmit one or more RSs in multiple different transmit beams (e.g., using beamsweeping to transmit over multiple beams) transmitted from the BS. Each transmit beam may carry the one or more RSs. The UE may receive the RSs from the BS and use the RSs for one or more purposes such as synchronization and/or channel measurements. For example, the RSs may include signals in a synchronization signal block (SSB) used for synchronization and/or a channel state information reference signal (CSI-RS) used for channel measurements. The signals in SSB designated as the RS may comprise one or more of a secondary synchronization signal (SSS) or a demodulation reference signal (DMRS). The UE may receive the RSs in one or more of the multiple different transmit beams transmitted from the BS. For example, certain transmit beams may be in the direction of the UE, and the UE may receive such transmit beams. Further, certain transmit beams may not be in the direction of the UE, and the UE may not receive such transmit beams.

The UE, like the BS, may also be capable of performing beamforming. For example, the UE may perform receiver side beamforming where the UE uses beamforming to receive signals. For example, the UE may be capable of receiving signals over a plurality of different receive beams using beamforming. Accordingly, at a given time, the UE may select a particular receive beam of the plurality of different receive beams to receive signals.

In certain aspects, the UE may perform measurements based on one or more RSs transmitted from the BS to determine which receive beam the UE should use for beamforming to receive signals from the BS. For example, the UE may use different receive beams at different times to receive one or more RSs from the BS (e.g., transmitted on one or more transmit beams from the BS). The UE may perform channel measurements (e.g., reference signal received power (RSRP), signal to interference plus noise ratio (SINR), channel quality indicator (CQI), etc.) on the received one or more RSs for each of the different receive beams and select a receive beam to use to receive signals from the BS based on the channel measurements. For example, the UE may select the receive beam with which the UE received the one or more RSs with the best channel conditions as indicated by the channel measurements. Such a procedure may be referred to as a receive beam scan.

In certain aspects, the UE may perform measurements based on one or more RSs transmitted from the BS to report channel measurements to the BS. For example, the UE may use a selected receive beam (e.g., selected based on channel measurements as discussed) to receive one or more RSs from the BS (e.g., transmitted on one or more transmit beams from the BS). The UE may perform channel measurements (e.g., reference signal received power (RSRP), signal to interference plus noise ratio (SINR), channel quality indicator (CQI), etc.) on the received one or more RSs for each of the different receive beams (or the selected receive beam) and report the channel measurements to the BS by transmitting an indication (e.g., CQI) of the channel measurements to the BS.

Accordingly, as discussed, the UE may be configured to itself determine which receive beam to use for receiving RSs from the BS.

In certain aspects, the one or more RSs transmitted by the BS may only occupy (e.g., span) a portion of the frequency (e.g., carrier) bandwidth the BS uses for transmitting signals (or that the UE uses for receiving signals). Accordingly, the BS may be able to transmit additional information (e.g., other channels) at the same time as the one or more RSs using frequency division multiplexing (FDM). For example, the BS may be configured to FDM the one or more RSs with a physical downlink shared channel (PDSCH) on one or more transmit beams. The one or more transmit beams on which the PDSCH is multiplexed, however, may not align with the receive beam that the UE has determined is the suitable receive beam for receiving signals based on RS channel measurements. If the UE continues with receiving the beam associated with the beam on which PDSCH is multiplexed, the UE may not be receiving on the ideal beam as determined by channel measurements based on RS. If the UE selects the ideal beam for receiving RS as the same beam for receiving PDSCH, that selected beam may not align with the beam on which PDSCH is multiplexed, resulting in poor decoding performance of the multiplexed PDSCH. Accordingly, certain aspects herein relate to techniques for the UE to determine which receive beam to use for receiving one or more RSs multiplexed in frequency with another channel (e.g., PDSCH) on one or more transmit beams, and using the determined receive beam to receive such signals.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 8:
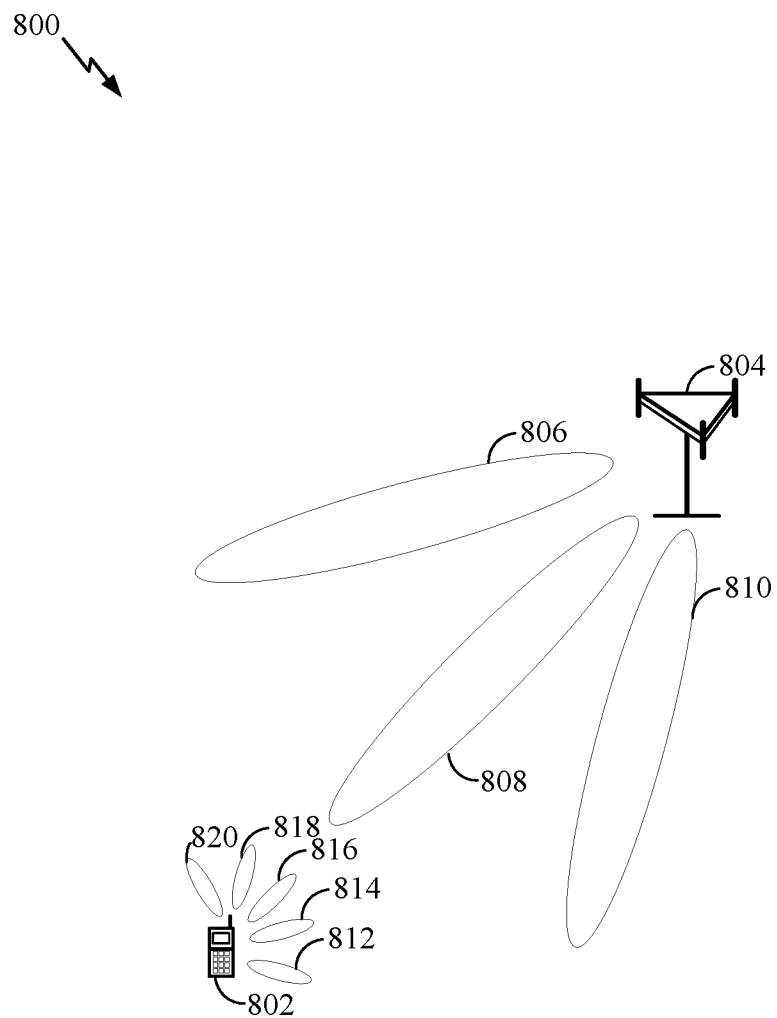
FIG. 8 illustrates an example of a UE and BS performing beamforming, in accordance with certain aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

Aspects of the present disclosure provide techniques and apparatus for a UE, such as UE 120, to determine which receive beam to use for receiving one or more RSs multiplexed in frequency with another channel (e.g., PDSCH), and using the determined receive beam to receive such signals.

UEs 120 may be configured to perform the operations and methods described herein for determining which receive beam to use for receiving one or more RSs multiplexed in frequency with another channel (e.g., PDSCH), and using the determined receive beam to receive such signals. BS 110 may comprise a transmission reception point (TRP), Node B (NB), 5G NB, access point (AP), new radio (NR) BS, Master BS, primary BS, etc.). The NR network 100 may include the central unit. The BS 110 may transmit the one or more RSs multiplexed in frequency with another channel (e.g., PDSCH).

Figure 9:
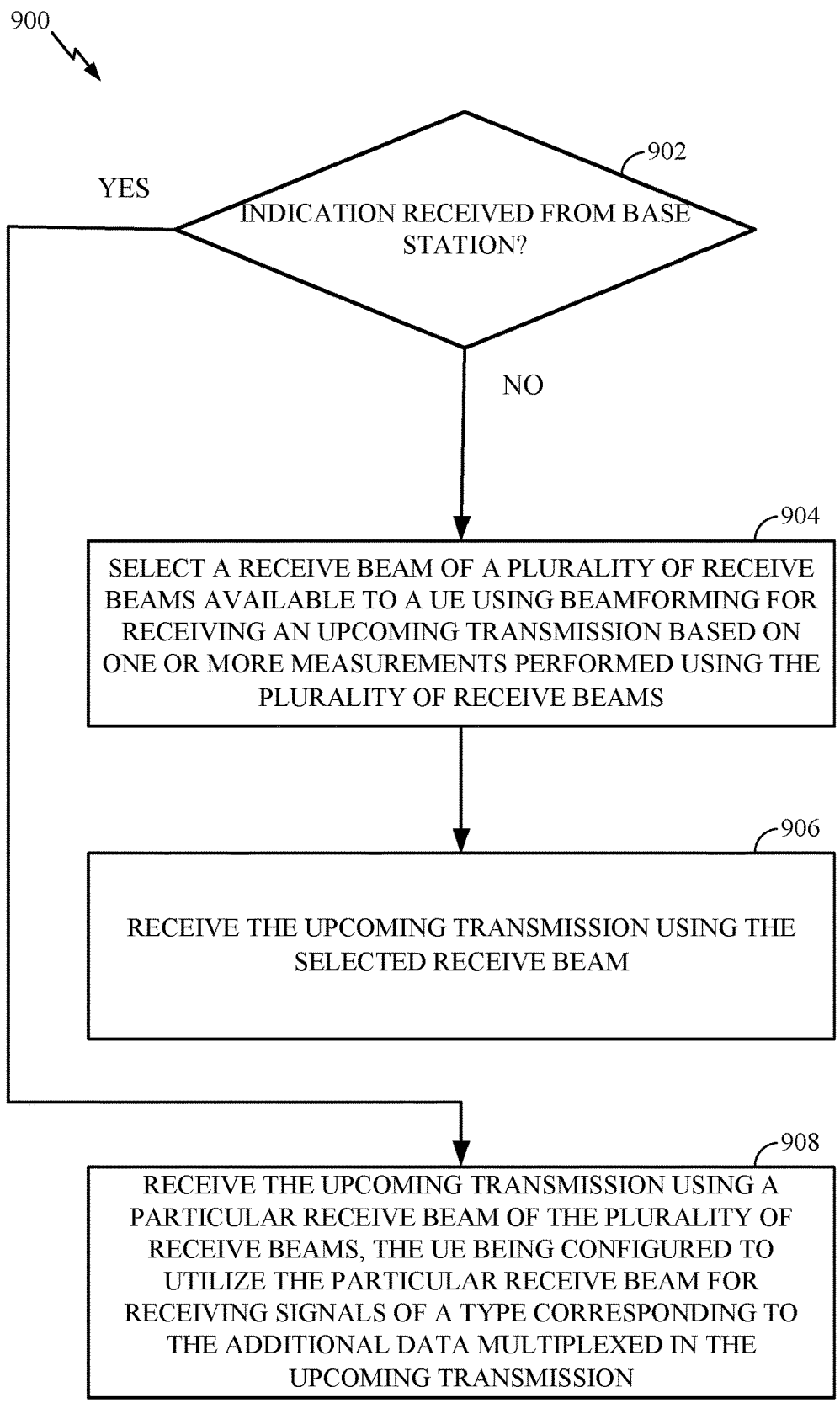
FIG. 9 illustrates example operations performed by a UE, in accordance with certain aspects of the present disclosure.

A UE 120 may be configured to perform the operations described and claimed herein, such as the operations described with respect to FIG. 9, for example.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
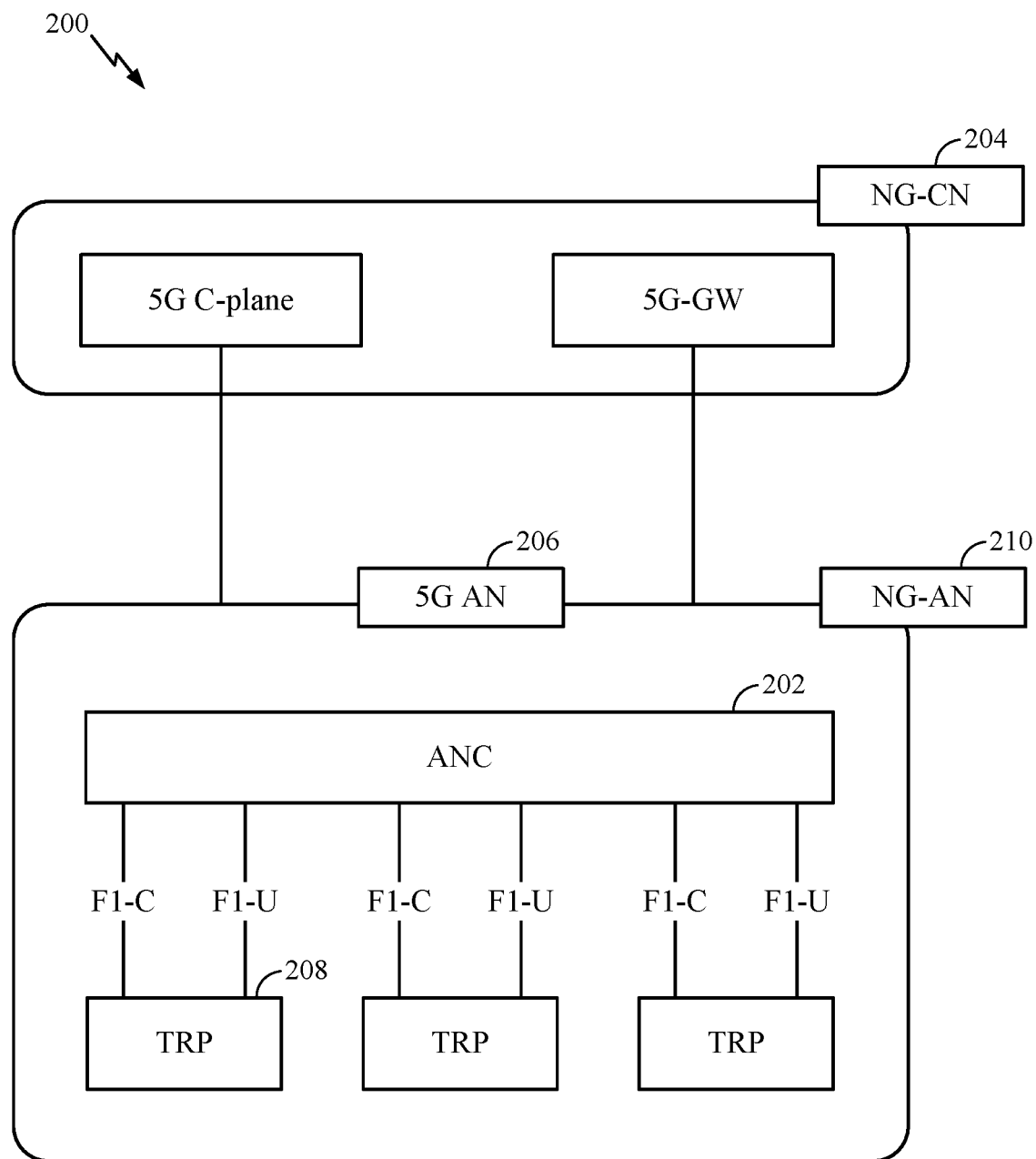
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

TRP 208, in certain aspects, is configured to transmit one or more RSs to a UE, such as a RS multiplexed in frequency with another channel (e.g., PDSCH), as discussed herein.

Figure 3:
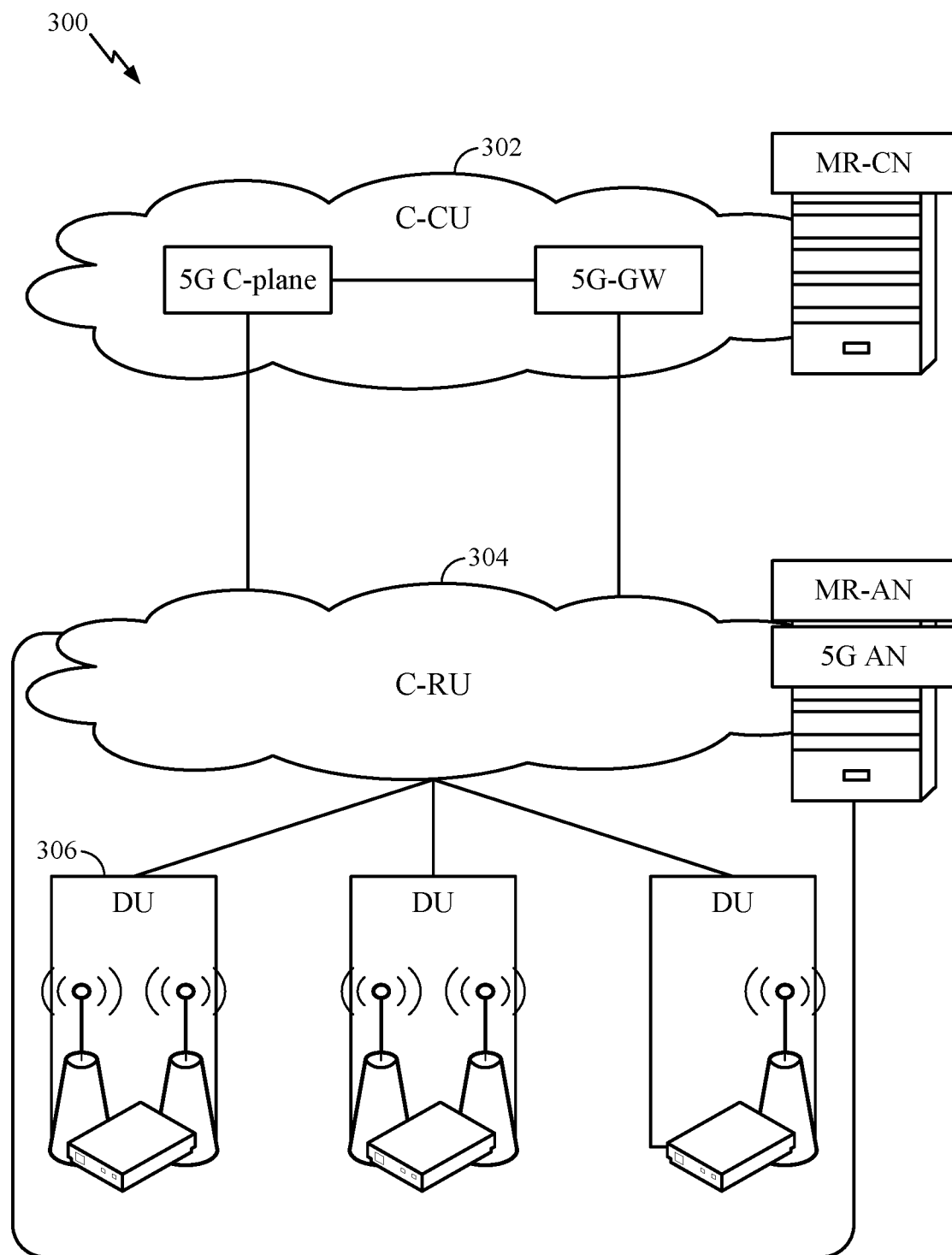
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

DU 306, in certain aspects, is configured to transmit one or more RSs to a UE, such as a RS multiplexed in frequency with another channel (e.g., PDSCH), as discussed herein.

Figure 4:
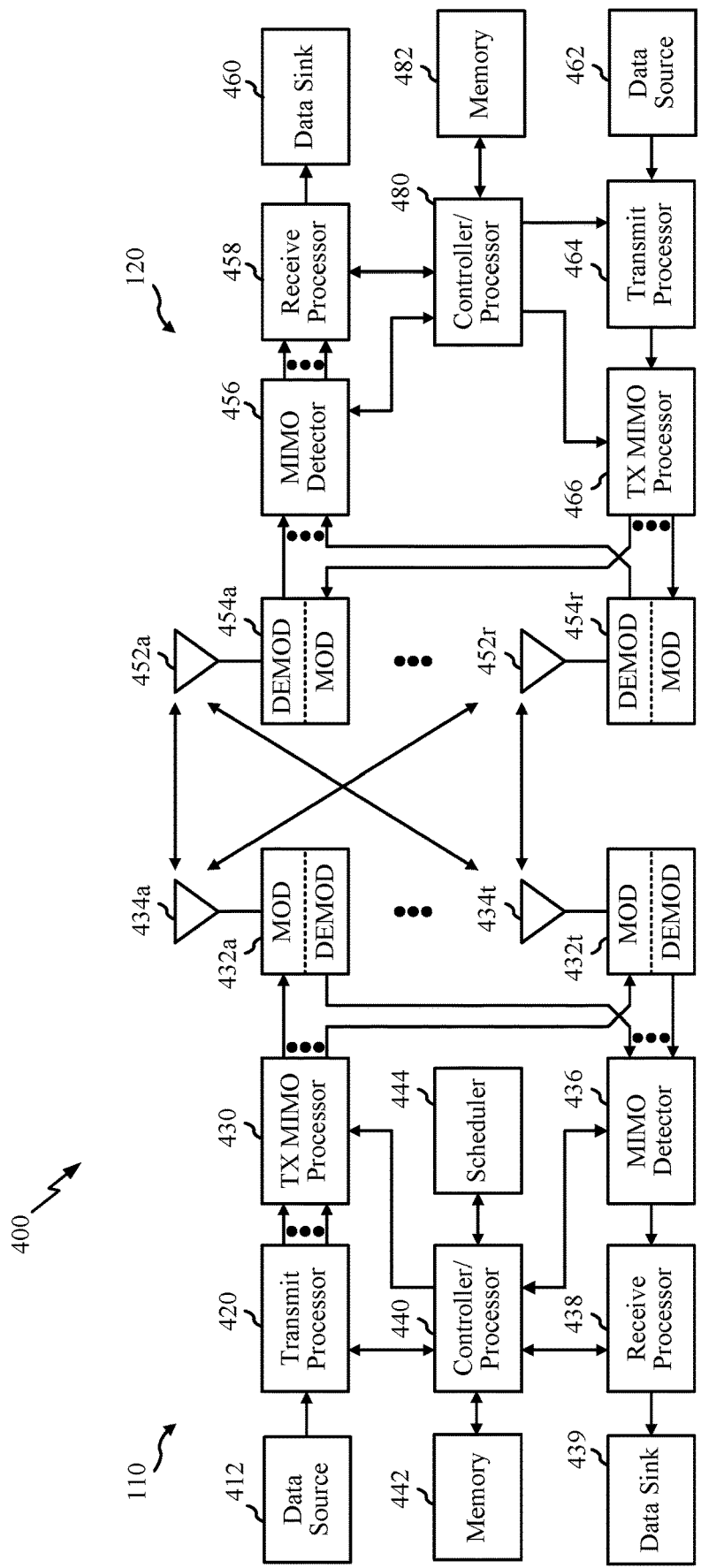
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform operations described herein, such as the operations 900 described with respect to FIG. 9. According to an example, antennas 434, DEMOD/MOD 432, processors 430, 420, 438 and/or controller/processor 440 of the BS 110 may be used to perform operations described herein.

As an example, one or more of the antennas 452, DEMOD/MOD 454, processors 466, 458, 464, and/or controller/processor 480 of the UE 120 may be configured to perform the operations described herein such as the described receiving, selecting, determining, reporting, and operations for selecting and receiving signaling in a time interval. Similarly, one or more of the 434, DEMOD/MOD 432, processors 430, 420, 438 and/or controller/processor 440 of the BS 110 may be configured to perform the operations described herein such as the described conveying, selecting, transmitting, receiving, sending, and determining.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). For example, the processor 420 may generate one or more RSs for multiplexed in frequency with another channel (e.g., PDSCH). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. Downlink signals may include, for example, one or more RSs multiplexed in frequency with another channel (e.g., PDS CH).

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
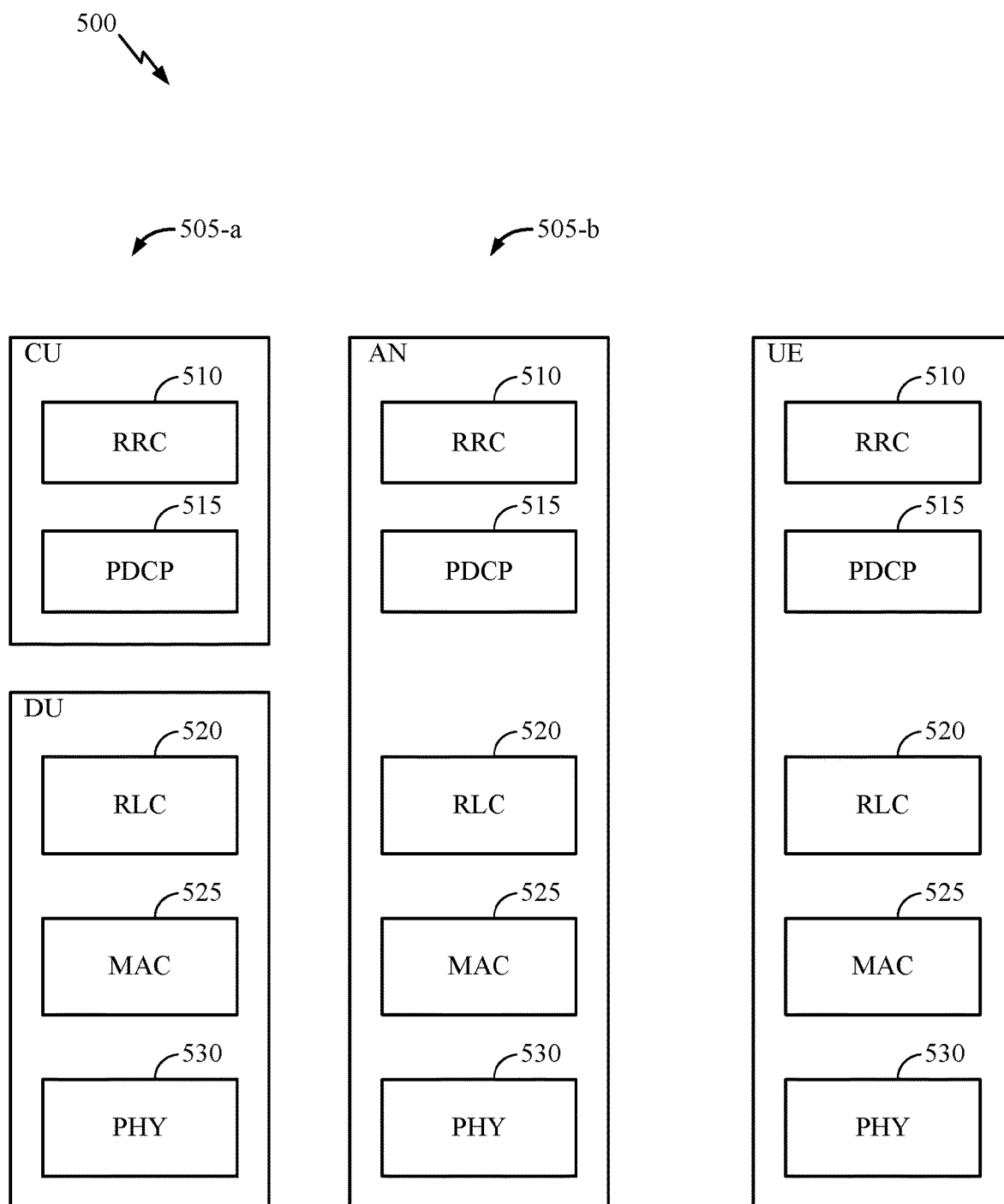
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
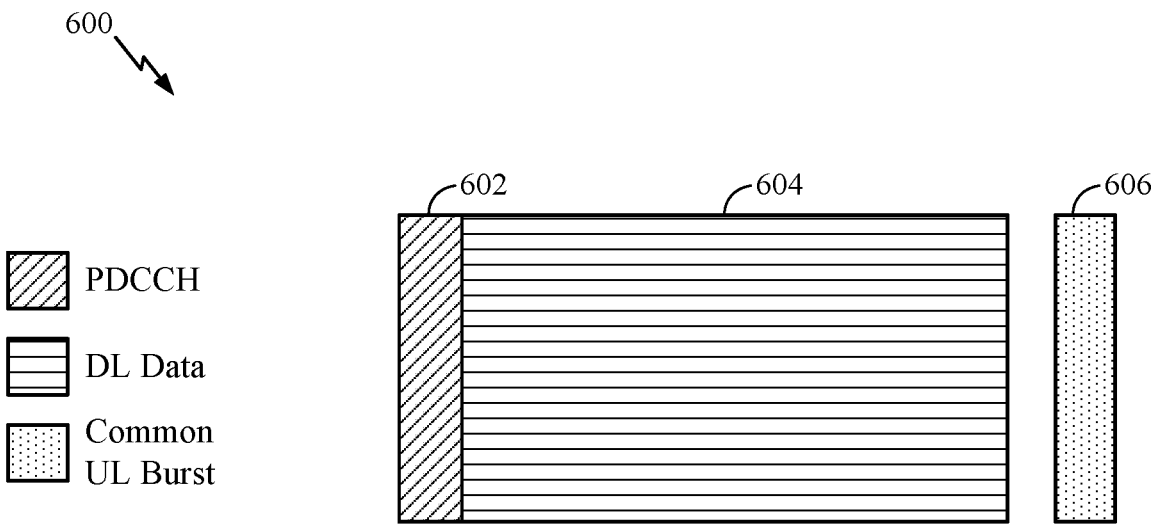
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. For example, one or more RSs may multiplexed in frequency with the PDSCH, as discussed herein. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH). For example, one or more RSs may multiplexed in frequency with the PDSCH, as discussed herein.

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
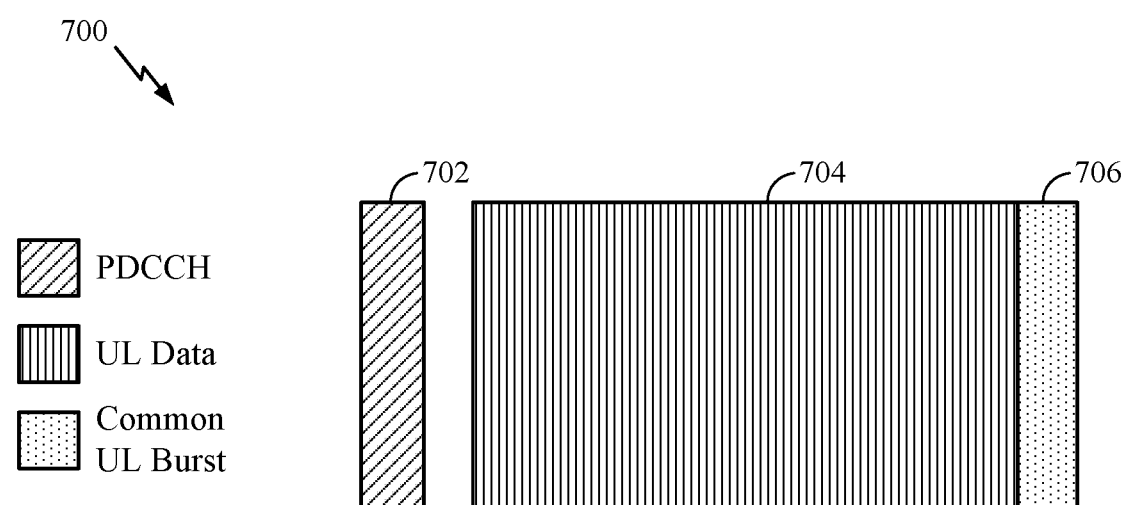
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Determination During A Reference Signal Transmission

Millimeter wave (mmW) may use beamforming (BF) to meet the link margin. Directional BF may be applied by both a transmitter and a receiver. As described above, BF makes transmission more directional as compared to sub-6 LTE systems.

FIG. 8 illustrates an example 800 of a UE 802 (e.g., corresponding to a UE 120 of FIG. 1) and a BS 804 (e.g., corresponding to a BS 110 of FIG. 1). The BS 804 may focus transmission energy in the illustrated narrow directional beams 806-810 (e.g., transmit beams). Similarly, the UE 802 may focus reception of energy on one of the narrow directional beams 812-820 (e.g., receive beams). In particular, the UE 802 may perform beamforming to receive energy over one of the beams 812-820 at a given time. The UE 802 may only be able to receive energy over a selected one of the beams 812-820 at any given time. Any signals arriving outside of the selected beam may be severely attenuated.

As discussed, BS 804 may transmit one or more RSs in one or more of beams 806-810. Further, UE 802 may select which of beams 812-820 to utilize to receive the one or more RSs transmitted by BS 804. As further described, BS 804 may use FDM to multiplex additional data (e.g., PDSCH) with the one or more RSs and transmit the multiplexed data and one or more RSs in one or more of beams 806-810.

As discussed, UE 802 may typically be configured to determine on its own which of beams 812-820 to utilize to receive the one or more RSs transmitted by BS 804. However, UE 802 may typically be configured (e.g., by BS 804) to utilize a particular beam 812-820 for receiving other data (e.g., PDSCH). In particular, if UE 802 were permitted to receive PDSCH on a beam the UE 802 selects itself for receiving RSs, the UE 802 may have poor decode performance of PDSCH because the PDSCH may be intended to be multiplexed with a different beam. On the other hand, requiring the UE 802 to always use the receive beam used for receiving PDSCH to receive the one or more RSs from BS 804 as well, would result in loss of flexibility for UE 802 to select a receive beam for receiving one or more RSs from BS 804, which may degrade channel estimation measurements.

Accordingly, certain aspects herein relate to techniques for the UE to determine which receive beam to use for receiving one or more RSs multiplexed in frequency with another channel (e.g., PDSCH), and using the determined receive beam to receive such signals. Such aspects beneficially allow PDSCH to be FDM multiplexed with RSs for transmission by the BS, thereby using communication resources more efficiently and not requiring additional transmissions at different times to transmit PDSCH. Further, such aspects allow for PDSCH to still be received with good decode performance.

In certain aspects, if BS 804 determines it intends to transmit PDSCH multiplexed with one or more RSs using FDM, the BS 804 transmits to the UE 802 an indication that the BS 804 is going to transmit PDSCH multiplexed with one or more RSs using FDM at a given time (e.g., at the next scheduled transmission time interval, symbol, OFDM symbol, slot index, time slot, etc.). If the UE 802 does not receive such an indication from the BS 804, the UE 802 may retain the capability to itself (e.g., autonomously) select a receive beam (e.g., one of beams 812-820) to receive signals (e.g., one or more RSs) from the BS 804 at the given time. For example, in this case, the UE may select a beam in order to advance the receive beam scan procedure. Further, the BS 804 does not multiplex PDSCH with the one or more RSs using FDM at the given time, and instead may transmit one or more RSs without PDSCH at the given time. If the UE 802 receives such an indication from the BS 804, the UE 802 may utilize a particular (e.g., as configured by BS 804) receive beam (e.g., one of beams 812-820) that is used by UE 802 for receiving PDSCH to receive signals (e.g., one or more RSs multiplexed with PDSCH using FDM) from the BS 804 at the given time.

For example, BS 804 may be configured to transmit one or more RSs in one or more beams (e.g., beams 806-810) at time n. In certain aspects, time n may correspond to an OFDM symbol index, a set of OFDM symbols (e.g., 4 consecutive OFDM symbols), and/or a slot index. The BS 804 may determine to transmit PDSCH and the one or more RSs together at time n using FDM. Accordingly, BS 804 may need to transmit a PDSCH grant (e.g., including an indication that PDSCH and the one or more RSs will be multiplexed together at time n using FDM) to the UE 802 at a time prior to n-$n_0$ to ensure the UE 802 has information in sufficient time to utilize the correct beam to receive PDSCH and the one or more RSs from BS 804. For example, $n_0$ may be based on one or more of a propagation time between UE 802 and BS 804, a signal processing time at UE 802, a time needed to perform beamforming at UE 802, etc. The PDSCH grant may be an indication to UE 802 that the BS 804 intends to transmit PDSCH and the one or more RSs together at time n using FDM. The PDSCH grant may be part of a downlink control information (DCI) scheduling. The PDSCH grant may include an indication of the time n. In certain aspects, if the BS 804 transmits the PDSCH grant prior to n-$n_0$, the BS 804 transmits PDSCH and the one or more RSs together at time n using FDM in the one or more beams. In certain aspects, if the BS 804 does not transmit the PDSCH grant prior to $n-n_0$, the BS 804 transmits the one or more RSs without PDSCH (e.g., alone) at time n using FDM in the one or more beams.

Correspondingly, UE 802 may be configured to determine which receive beam (e.g., of beams 812-820) to use based on whether or not UE 802 receives a PDSCH grant (e.g., including an indication that PDSCH and the one or more RSs will be multiplexed together at time n using FDM) from BS 804. For example, if the UE 802 does not receive the PDSCH grant by time $n-n_0$, the UE 802 may be configured to select a receive beam itself, such as using techniques discussed herein, for receiving signals from BS 804 at time n.

In certain aspects, if the UE 802 receives the PDSCH grant by time $n-n_0$, the UE 802 may be configured to use the receive beam with the best channel measurements based on a prior measurement of one or more RSs transmitted by BS 804 as discussed. However, BS 804 may not have any information regarding the receive beam selected by the UE 802 as such determination of a receive beam is made by the UE 802 itself. Accordingly, in certain aspects, the UE 802 may be configured to transmit a measurement report indicating the channel measurement when using the receive beam to measure the one or more RSs to the BS 804, so the BS 804 can determine transmission parameters (e.g., modulation, coding, etc.) with which to transmit subsequent transmissions. In certain aspects, UE 802 may perform measurements of the one or more RSs while simultaneously receiving the PDSCH on the selected beam. In particular, since the receive beam over which the UE 802 is simultaneously receiving the one or more RSs and the PDSCH is already known to be a good candidate receive beam for receiving RS at the UE 802 based on previous measurements, the UE 802 may perform measurements on the one or more RSs to determine if the receive beam remains a good candidate receive beam.

Alternatively, in certain aspects, if the UE 802 receives the PDSCH grant by time $n-n_0$, the UE 802 may be configured to utilize one of: 1) a default or previously configured beam to receive signals from BS 804 at time n; or 2) a beam indicated in DCI (e.g., if indicated at a time prior to $n-n_0-n_1$). In such aspects, the UE 802 may determine to not perform measurements of the one or more RSs while simultaneously receiving the PDSCH on the beam if the beam is not a candidate for receiving the one or more RSs as determined by the UE 802. The UE 802 may determine to perform measurements of the one or more RSs while simultaneously receiving the PDSCH on the beam if the beam is a candidate for receiving the one or more RSs as determined by the UE 802.

In certain aspects, whether the UE 802 uses the receive beam with the best channel measurements based on a prior measurement of one or more RSs transmitted by BS 804 as discussed or instead uses one of: 1) a default or previously configured beam to receive signals from BS 804 at time n; or 2) a beam indicated in DCI (e.g., if indicated at a time prior to $n-n_0-n_1$), is preconfigured at the UE 802, as the BS 804 and UE 802 may be configured to always utilize the same behavior.

In certain aspects, BS 804 may be configured to itself determine whether to transmit one or more RSs multiplexed using FDM with PDSCH on a default transmit beam, on a transmit beam selected by the BS 804, or on a transmit beam for which the UE 802 previously measured one or more RSs and selected a receive beam. The UE 802 may then be configured to determine which receive beam to use to receive signals from the BS 804 at time n based on the transmission scheme utilized by the BS 804 at that time (e.g., as indicated in the PDSCH grant to the UE 802 by the BS 804). For example, if the BS 804 transmits one or more RSs multiplexed using FDM with PDSCH on a default transmit beam or a transmit beam selected by BS 804, the UE 802 may be configured to utilize a default or previously configured receive beam to receive signals from BS 804 at time n, or a receive beam indicated in DCI (e.g., if indicated at a time prior to $n-n_0-n_1$), respectively. If the BS 804 transmits one or more RSs multiplexed using FDM with PDSCH on a transmit beam for which the UE 802 previously measured one or more RSs and selected a receive beam, the UE 802 may be configured to use a receive beam used for prior measurement of the transmit beam.

In certain aspects, if the BS 804 transmits the PDSCH grant after time $n-n_0$, for PDSCH transmission in a slot containing time n (i.e., a slot containing the one or more RSs), the BS 804 may use time division multiplexing to multiplex the one or more RSs with the PDSCH in time instead of in frequency, so that the one or more RSs and PDSCH are not transmitted at the same time (e.g., no PDSCH is allocated by BS 804 on the same OFDM symbol on which the one or more RSs are transmitted by BS 804). In certain aspects, the PDSCH may be rate-matched around or punctured by the one or more RSs. For example, the PDSCH may be rate-matched to the allocated TDM resource. In certain such aspects, the UE does not receive the PDSCH in the slot.

In certain aspects, when the UE 802 itself selects a beam for receiving one or more RSs, it may do so only for receiving a particular type(s) of RS and not for other types of RS. For example, the UE 802 may select a beam for receiving CSI-RS but not for receiving SSB (or vice versa). For example, one type of RS (e.g., SSB) may be received by UE 802 using a particular receive beam (e.g., as configured by BS 804) (e.g., always received using the particular receive beam, SSB of certain index are received with the particular receive beam, etc.). Accordingly, in certain aspects, BS 804 may schedule PDSCH to be multiplexed using FDM with the RS that uses the particular receive beam, so that the PDSCH and the RS are transmitted together, and the other RS may be sent separately at a different time by the BS 804, so that UE 802 can select a beam to receive the other RS.

FIG. 9 illustrates example operations 900 which may be performed by UE, according to aspects of the present disclosure. The UE may include one or more modules of the UE 120 illustrated in FIG. 4.

At 902, the UE determines if an indication is received from a base station, the indication indicating if an upcoming transmission from the base station includes additional data multiplexed with a reference signal (RS) using frequency division multiplexing.

If at 902 the UE determines the indication is not received from the base station, the operations 900 proceed to 904. At 904, the UE selects a receive beam of a plurality of receive beams available to the UE using beamforming for receiving the upcoming transmission based on one or more measurements performed using the plurality of receive beams. At 906, the UE receives the upcoming transmission using the selected receive beam.

If at 902 the UE determines the indication is received from the base station, the operations 900 proceed to 908. At 908, the UE receives the upcoming transmission using a particular receive beam of the plurality of receive beams, the UE being configured to utilize the particular receive beam for receiving signals of a type corresponding to the additional data.

Figure 10:
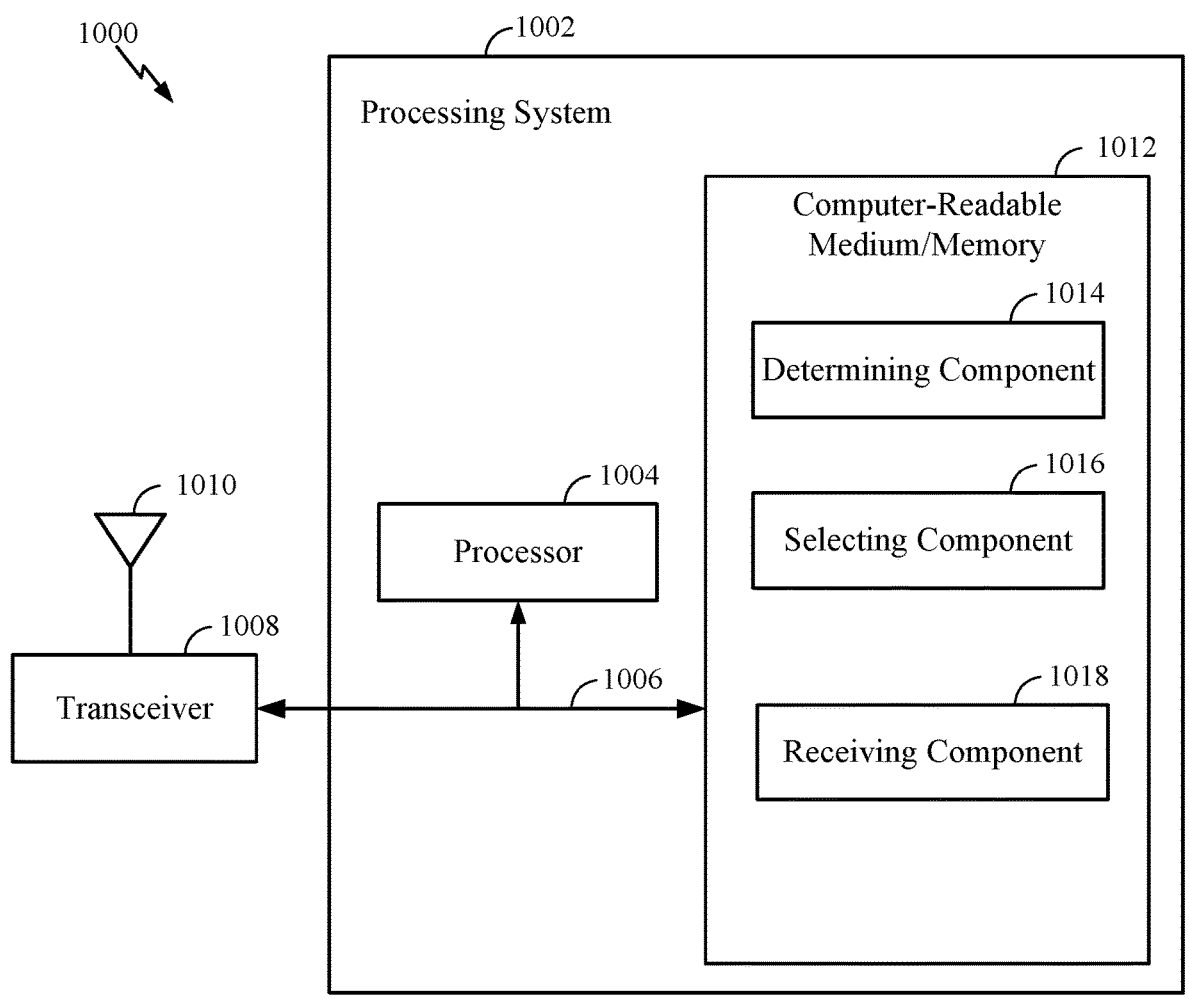
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 9, or other operations for performing the various techniques discussed herein.

In certain aspects, the processing system 1002 further includes a determining component 1014 for performing the operations illustrated in 902 of FIG. 9. Additionally, the processing system 1002 includes a selecting component 1016 for performing the operations illustrated in 904 of FIG. 9. Additionally, the processing system 1002 includes a receiving component 1018 for performing the operations illustrated in 906 and 908 of FIG. 9. The determining component 1014, selecting component 1016, and receiving component 1018 may be coupled to the processor 1004 via bus 1006. In certain aspects, the determining component 1014, selecting component 1016, and receiving component 1018 may be hardware circuits. In certain aspects, the determining component 1014, selecting component 1016, and receiving component 1018 may be software components that are executed and run on processor 1004.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining a receive beam of a plurality of receive beams for receiving an upcoming transmission from a base station, wherein the determining is based on whether an indication is received from the base station indicating if the upcoming transmission includes a reference signal (RS) multiplexed with additional data; and
   receiving the upcoming transmission using the determined receive beam.

2. The method of claim 1, wherein the determining further comprises:
   determining that the indication is not received from the base station; and
   selecting the receive beam from the plurality of receive beams based on one or more measurements performed using the plurality of receive beams.

3. The method of claim 1, further comprising receiving the indication from the base station.

4. The method of claim 3, wherein the determining further comprises:
   selecting the receive beam from the plurality of receive beams based on the UE being configured to use a particular receive beam for receiving a type of signal corresponding to the additional data.

5. The method of claim 4, wherein the particular receive beam is a previously selected receive beam of the plurality of receive beams based on one or more measurements performed using the plurality of receive beams, and wherein the one or more measurements are performed on a previously received RS.

6. The method of claim 5, wherein the particular receive beam is the previously selected receive beam only when the one or more measurements include a measurement for the particular receive beam, and the measurement for the particular receive beam is reported by the UE to the base station.

7. The method of claim 4, wherein the particular receive beam is a default beam for receiving the additional data or is indicated in downlink control information received from the base station.

8. The method of claim 1, wherein the determining is based on whether the indication is received at least a first time period prior to the upcoming transmission.

9. The method of claim 1, wherein the additional data comprises a physical downlink shared channel (PDSCH), and wherein the indication comprises a PDSCH grant.

10. The method of claim 1, wherein the RS comprises at least one of a synchronization signal block and a channel state information reference signal.

11. The method of claim 1, wherein the additional data comprises a physical downlink shared channel (PDSCH), and further comprising determining that the indication is not received from the base station based on receiving a PDSCH grant after a first time period prior to the upcoming transmission and one of:
   receiving the PDSCH at a different time period than the RS; or
   not receiving the PDSCH.

12. The method of claim 11, wherein the PDSCH is multiplexed with the RS using time division multiplexing.

13. A user equipment (UE) comprising:
   a memory; and
   a processor coupled to the memory, the processor being configured to:
      determine a receive beam of a plurality of receive beams for receiving an upcoming transmission from a base station, wherein the determining is based on whether an indication is received from the base station indicating if the upcoming transmission includes a reference signal (RS) multiplexed with additional data; and
      receive the upcoming transmission using the determined receive beam.

14. The UE of claim 13, wherein the determining further comprises:
   determining that the indication is not received from the base station; and
   selecting the receive beam from the plurality of receive beams based on one or more measurements performed using the plurality of receive beams.

15. The UE of claim 13, wherein the processor is further configured to receive the indication from the base station.

16. The UE of claim 15, wherein the determining further comprises:
   selecting the receive beam from the plurality of receive beams based on the UE being configured to use a particular receive beam for receiving a type of signal corresponding to the additional data.

17. The UE of claim 16, wherein the particular receive beam is a previously selected receive beam of the plurality of receive beams based on one or more measurements performed using the plurality of receive beams, and wherein the one or more measurements are performed on a previously received RS.

18. The UE of claim 17, wherein the particular receive beam is the previously selected receive beam only when the one or more measurements include a measurement for the particular receive beam, and the measurement for the particular receive beam is reported by the UE to the base station.

19. The UE of claim 16, wherein the particular receive beam is a default beam for receiving the additional data or is indicated in downlink control information received from the base station.

20. The UE of claim 13, wherein the determining is based on whether the indication is received at least a first time period prior to the upcoming transmission.

21. The UE of claim 13, wherein the additional data comprises a physical downlink shared channel (PDSCH), and wherein the indication comprises a PDSCH grant.

22. The UE of claim 13, wherein the RS comprises at least one of a synchronization signal block and a channel state information reference signal.

23. The UE of claim 13, wherein the additional data comprises a physical downlink shared channel (PDSCH), and wherein the processor is further configured to determine that the indication is not received from the base station based on receiving a PDSCH grant after a first time period prior to the upcoming transmission and one of:
   receive the PDSCH at a different time period than the RS; or
   not receive the PDSCH.

24. The UE of claim 23, wherein the PDSCH is multiplexed with the RS using time division multiplexing.

25. A user equipment (UE) comprising:
   means for determining a receive beam of a plurality of receive beams for receiving an upcoming transmission from a base station, wherein the determining is based on whether an indication is received from the base station indicating if the upcoming transmission includes a reference signal (RS) multiplexed with additional data; and
   means for receiving the upcoming transmission using the determined receive beam.

26. The UE of claim 25, further comprising means for receiving the indication from the base station.

27. The UE of claim 26, wherein the means for determining further comprises:
   means for selecting the receive beam from the plurality of receive beams based on the UE being configured to use a particular receive beam for receiving a type of signal corresponding to the additional data.

28. A non-transitory computer readable storage medium that stores instructions that when executed by a user equipment (UE) causes the UE to perform a method for wireless communication, the method comprising:
   determining a receive beam of a plurality of receive beams for receiving an upcoming transmission from a base station, wherein the determining is based on whether an indication is received from the base station indicating if the upcoming transmission includes a reference signal (RS) multiplexed with additional data; and
   receiving the upcoming transmission using the determined receive beam.

29. The non-transitory computer readable storage medium of claim 28, wherein the method further comprises receiving the indication from the base station.

30. The non-transitory computer readable storage medium of claim 29, wherein the determining further comprises:
   selecting the receive beam from the plurality of receive beams based on the UE being configured to use a particular receive beam for receiving a type of signal corresponding to the additional data.

* * * * *